US009627927B1

(12) United States Patent
Rao

(10) Patent No.: US 9,627,927 B1
(45) Date of Patent: Apr. 18, 2017

(54) EMERGENCY POWER MODULE AND METHOD FOR PROVIDING EMERGENCY POWER

(71) Applicant: Litetronics International, Inc., Harvey, IL (US)

(72) Inventor: Raghu Rao, Romeoville, IL (US)

(73) Assignee: LITETRONICS INTERNATIONAL, INC., Harvey, IL (US)

( * ) Notice: Subject to any disclaimer, the term of this patent is extended or adjusted under 35 U.S.C. 154(b) by 0 days.

(21) Appl. No.: 15/184,969

(22) Filed: Jun. 16, 2016

(51) Int. Cl.
| | |
|---|---|
| *H02J 9/00* | (2006.01) |
| *H02J 7/00* | (2006.01) |
| *H02J 9/06* | (2006.01) |
| *H01M 10/42* | (2006.01) |
| *H05B 33/08* | (2006.01) |

(52) U.S. Cl.
CPC .......... *H02J 9/061* (2013.01); *H01M 10/425* (2013.01); *H02J 7/0063* (2013.01); *H05B 33/0845* (2013.01); *H01M 2010/4271* (2013.01); *H01M 2220/10* (2013.01); *H02J 2007/0067* (2013.01)

(58) Field of Classification Search
CPC .. H02J 9/061; H02J 7/0063; H02J 2007/0067; H01M 10/425; H01M 2010/4271; H01M 2220/10; H05B 33/0845
USPC .......................................................... 307/66
See application file for complete search history.

(56) References Cited

U.S. PATENT DOCUMENTS

2015/0008844 A1* 1/2015 Wilson ..................... H02J 9/02
315/291

* cited by examiner

*Primary Examiner* — Hal Kaplan
(74) *Attorney, Agent, or Firm* — Steve Witters; Witters & Associates

(57) ABSTRACT

Technologies are described for an emergency power module and a method of providing emergency power. The emergency power module has an emergency power driver, a DC power supply, and a programmable emergency power controller. The emergency power driver is configured to sense an interruption of power and direct power from the DC power supply, through the programmable emergency power controller, and to the at least one electrical device, upon the interruption of power in the external electrical power source. The programmable emergency power controller is programmable through a program interface and control a programmed voltage of power to flow from the DC power supply to the at least one electrical device.

20 Claims, 9 Drawing Sheets

EMERGENCY POWER MODULE AND METHOD FOR PROVIDING EMERGENCY POWER

FIELD OF THE DISCLOSURE

This invention generally relates to power backup systems, and, more particularly, to battery powered backup systems.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Upon an interruption in a power supply, it is often desired, or even required, to have a power backup. For example, emergency lighting, or "egress lighting", may be needed to provide power for illumination automatically in the event of any interruption in the normal power supply. Emergency lighting may be required under government regulations and may be designed to illuminate and identify hallways, stairwells, and exits to facilitate safe and orderly evacuation from a structure. It may be desired to have power backup for providing standby lighting. Standby lighting is the illumination in the event of a power failure when you wish to continue normal activities for an extended period of time.

Often, it is desired, or even required, to provide a sufficient amount of power backup for a sufficient amount of time. For example, adequate lighting may be desired for at least 90 minutes upon a disruption in the normal power supply or source.

SUMMARY

In at least one embodiment of the present disclosure, an emergency power module is provided. The emergency power module has an emergency power driver in electrical communication with an external electrical power source and at least one electrical device. A DC power supply, for example a rechargeable battery, is provided to provide power in the event of an interruption in power in an external power source. The emergency power driver is configured to sense an interruption of power in the external electrical power source and direct power from the DC power supply, through a programmable emergency power controller, and to the at least one electrical device, upon the interruption of power in the external electrical power source. The programmable emergency power controller is programmable through a program interface and configured and disposed to control a programmed voltage of power to flow from the DC power supply to the at least one electrical device.

In at least one other embodiment of the present disclosure, an emergency power module has an emergency power driver in electrical communication with an external electrical power source and at least one electrical device. A rechargeable battery is in electrical communication with the emergency power driver or the external electrical power source. The emergency power driver is configured to sense an interruption of power in the external electrical power source and direct power from the rechargeable battery through a programmable emergency power controller and to the at least one electrical device, upon the interruption of power in the external electrical power source. The programmable emergency power controller is configurable to a first state and a second state. The power directed from the rechargeable battery, through the programmable emergency power controller configured to the first state, to a first electrical device is substantially the same as the power directed from the rechargeable battery, through the programmable emergency power controller configured to the second state, to a second electrical device, a power demand of the first electrical device being different than a power demand of the second electrical device.

In at least one further embodiment of the present disclosure, a method for providing emergency power to at least one electrical device is provided. The method comprises determining a power demand of the at least one electrical device and determining an amount of emergency power to supply to the at least one electrical device. A controllable DC power supply is configured to provide the determined amount of emergency power to supply to the at least one electrical device, wherein the configuring of the controllable DC power supply is based upon the determined power demand and the determined an amount of emergency power. A disruption in a primary power supply to the at least one electrical device is sensed and, upon sensing the disruption in the primary power supply, the determined amount of emergency power is provide to the at least one electrical device by controlling the supplied emergency power with the configured controllable DC power supply.

BRIEF DESCRIPTIONS OF THE DRAWINGS

The foregoing and other features of this disclosure will become more fully apparent from the following description and appended claims, taken in conjunction with the accompanying drawings and examples. Understanding that these drawings depict only several embodiments in accordance with the disclosure and are, therefore, not to be considered limiting of its scope, the disclosure will be described with additional specificity and detail through use of the following figures, which are idealized, are not to scale and are intended to be merely illustrative of aspects of the present disclosure and non-limiting. In the drawings, like elements may be depicted by like reference numerals. The drawings are briefly described as follows:

DETAILED DESCRIPTION

Figure 1:
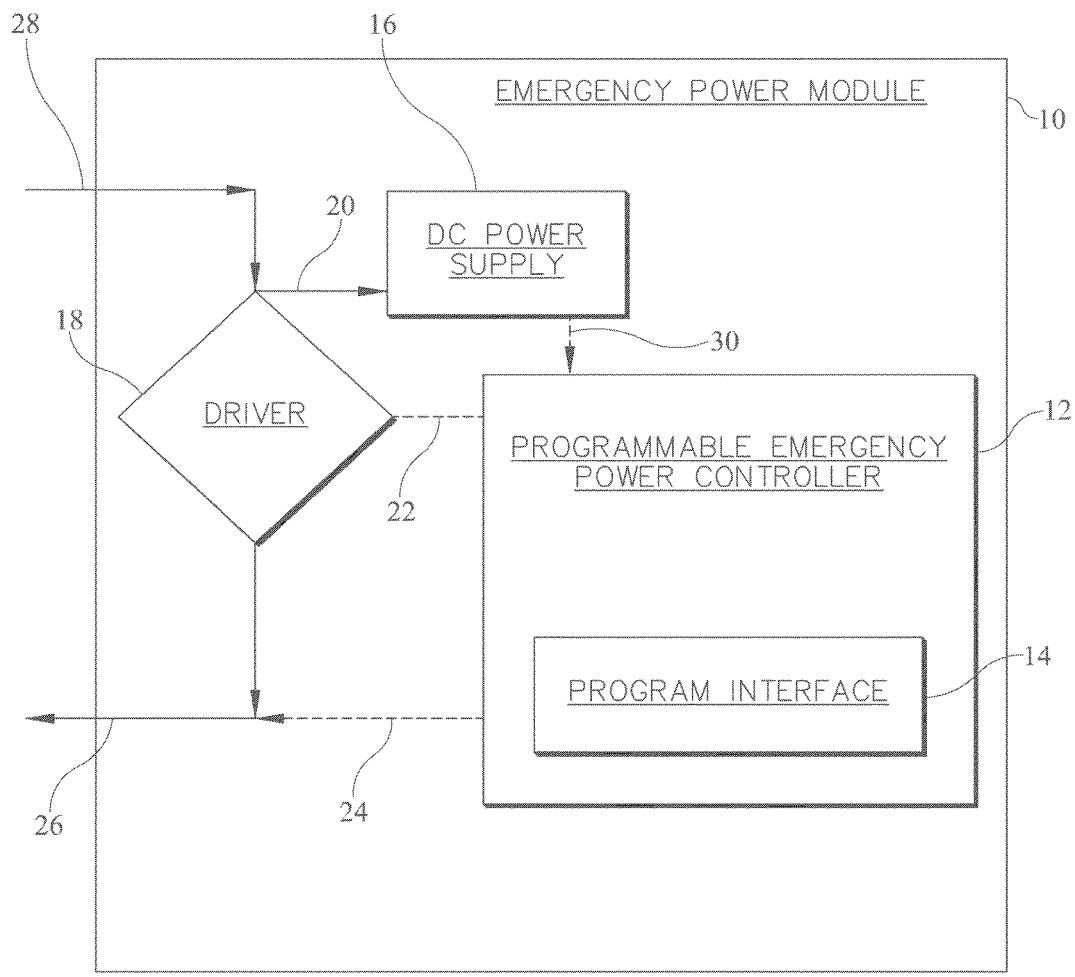
FIG. 1 is an illustrative diagram of an emergency power module of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This present disclosure addresses issues associated providing emergency power to electrical devices upon a disruption in a primary or external power source or supply. An illustrative example of use of the emergency power module of the present disclosure is to provide emergency lighting in the event of a power failure. However, it is to be understood that the presently disclosed emergency power module may be used to provide emergency power to a wide variety of electrical devices.

In at least one embodiment of the presently disclosed emergency power module, the emergency power module has a programmable emergency power controller. The programmable emergency power controller may be configured to supply a desired amount of power to a selected electrical device. The configurability of the programmable emergency power controller, or a controllable DC power supply, may permit the use of the presently disclosed emergency power module in a variety of applications and may minimize, or even eliminate, a need to have a specifically designed emergency power module for each selected electrical device. For example, the emergency power module of the presently disclosure may be configured to provide a desired or determined amount of emergency power to luminaires having different power demands.

FIG. 1 shows an illustrative diagram of an emergency power module 10. Emergency power module 10 has an emergency power driver 18 in electrical communication with an external electrical power source, via electrical connecting line 28, and at least one electrical device, via electrical connecting line 26. A DC power supply 16 may be in electrical communication with emergency power driver 18, or the external electrical power source, via electrical connecting line 28. For example, DC power supply 16 may be a rechargeable battery and may be recharged through electrical connecting line 20.

Emergency power driver 18 is configured to sense an interruption of power in the external electrical power source, or electrical connecting line 28, and direct power from DC power supply 16, with connection 30, through a programmable emergency power controller 12, and to the at least one electrical device, through electrical connecting lines 24 and 26, upon the interruption of power in the external electrical power source or electrical connecting line 28. For example, emergency power driver 18 may communicate with programmable emergency power controller 12, with communication line 22, and switch the power supplied to the at least one electrical device from the external electrical power source to DC power supply 16.

Programmable emergency power controller 12 is programmable with a program interface 14 and is configured and disposed to control a programmed voltage of power to flow from DC power supply 16, to the at least one electrical device, through electrical connecting lines 24 and 26.

Program interface 14 may have a wired interface, a radio interface, or mechanical interface which may provide for remote or manual programming of programmable emergency power controller 12. For example, programmable emergency power controller 12 may be manually programmable and program interface 14 may have at least one dip switch or a bank of dip switches.

Programmable emergency power controller 12 may be configured to route power from DC power supply 16 and through at least one resistor, or from a controllable DC power supply, and to the at least one electrical device, through electrical connecting lines 24 and 26, upon the sensed interruption of power in the external electrical power source with emergency power driver 18.

For example, program interface 14 may have a plurality of the dip switches configured to control the voltage of power flowing from DC power supply 16 to the at least one electrical device, through electrical connecting lines 24 and 26. Each of the plurality of dip switches may have an on position and an off position and configured to control the programmed voltage to the at least one electrical device. In at least one illustrative example, each of the plurality of dip switches may have at least one resistor in electrical communication therewith and configured to program programmable emergency power controller to control a desired voltage to the at least one electrical device, through electrical connecting lines 24 and 26, upon being switched to the on position.

In another illustrative example, the at least one electrical device in electrical communication with programmable emergency power controller 12, with electrical connecting line 24, may comprise at least one LED lamp. For example, the at least one electrical device may be a luminaire having one or more LED lamps, such as tubular LED lamps. Programmable emergency power controller 12 may be programmable to control the power flowing to the at least one electrical device, through electrical connecting lines 24 and 26, between about 0 to about 10 volts.

Figure 2:
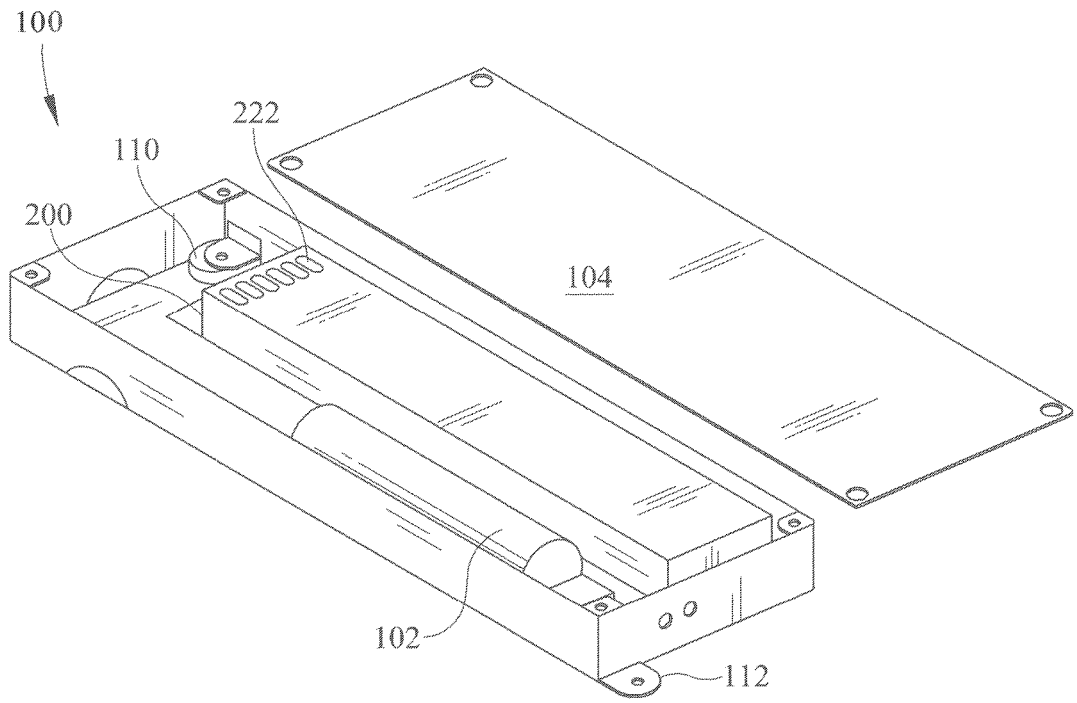
FIG. 2 is a perspective view of an emergency power module of the present disclosure.

FIG. 2 shows a perspective view of an illustrative example of emergency power module 100 of the present disclosure. Emergency power module 100 comprises an emergency power driver and a programmable emergency power controller, both in a case 200. The emergency power driver is configured and disposed in case 200 to become in electrical communication with an external electrical power source and at least one electrical device. A rechargeable battery 102 is in electrical communication with the emergency power driver. The emergency power driver is configured to sense an interruption of power in the external electrical power source and direct power from rechargeable battery 102, through the programmable emergency power controller and to the at least one electrical device, upon the interruption of power in the external electrical power source.

The programmable emergency power controller may have at least one switch 222 configured and disposed to control the voltage of power flowing from rechargeable battery 102 to the at least one electrical device, wherein the controlled voltage may be less than a non-controlled voltage. Switches 222 may be accessible on case 200 and may be manually turned to an on position and an off position. For example, switches 222 may be manually controllable dip switches.

Figure 3:
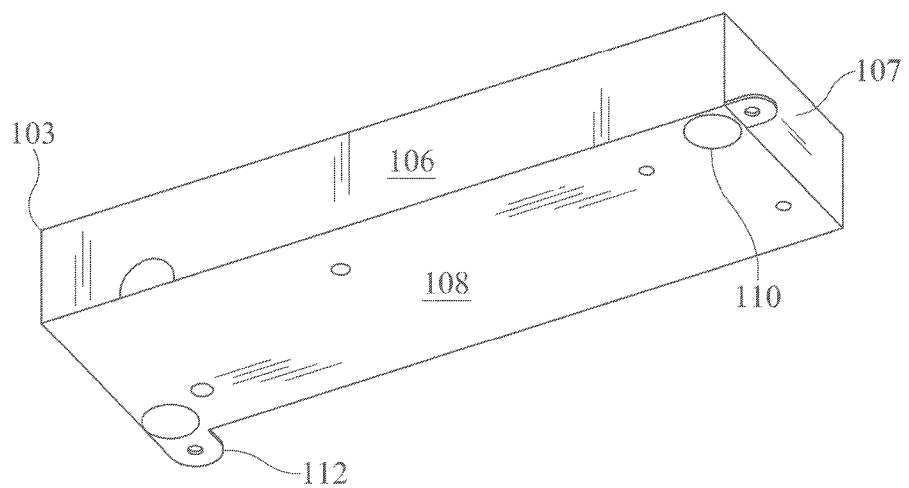
FIG. 3 is a second perspective view of the emergency power module shown in FIG. 1.

FIG. 3 is a second perspective view of the emergency power module 100. Emergency power module 100 may be housed in housing 103 which may be configured to to be held to an electrical device that it is to supply backup or emergency power or to a portion of a structure. Housing 103 may be configured to mechanically or magnetically hold emergency module 100 to an electrical device or a portion of the structure. In at least one illustrative example, housing 103 may be configured to be magnetically attached to a luminaire to which it may provide emergency power. For example, housing 103 may be magnetically held to a troffer.

For example, emergency module 100 may have a rectangular housing 103 with end walls 107, side walls 106, top wall 108, and removable bottom wall 104. Housing 103 may house casing 200 and rechargeable battery 102. In at least one embodiment, emergency power module 100 has magnets 110 disposed proximate top wall 108, configured to hold emergency power module 100 to a ferromagnetic material. In at least one other embodiment, top wall 108 has tabs with apertures 112, extending beyond side walls 102 or end walls 107, configured and disposed to mechanically attach emergency power module 100, for example with fasteners.

Figure 4:
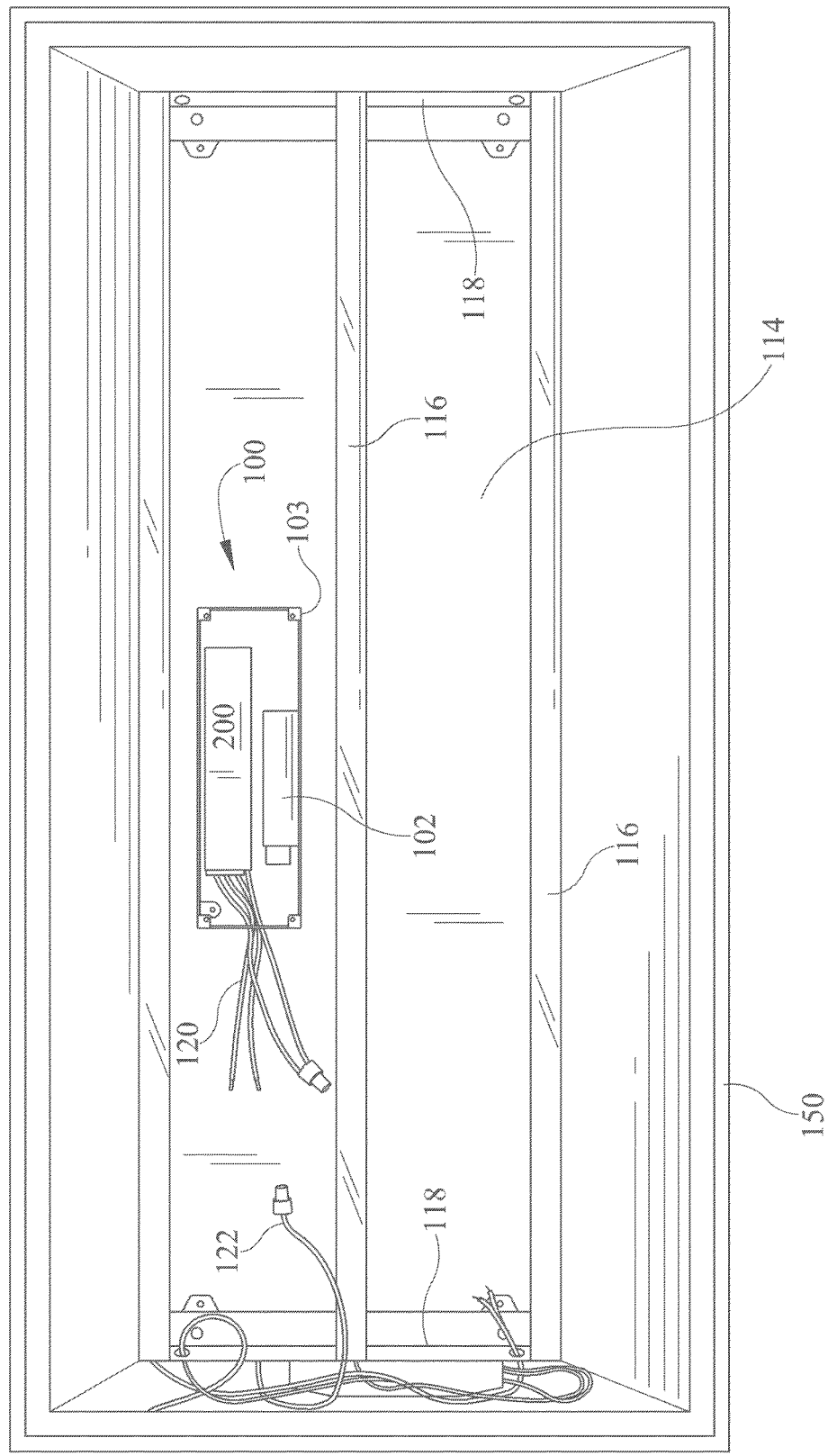
FIG. 4 is a perspective view of the emergency power module shown in FIG. 1 installed with a luminaire.

FIG. 4 shows an illustrative use of emergency power module 100 installed with a luminaire 150. Luminaire 150 may comprise one or more lamps 116, which may be LED lamps. Emergency power module 100 may be magnetically held to a ferromagnetic partition of luminaire 150, such as troffer 114. LED lamps 116 may be held to troffer 114 with rails 118, and rails 118 may be magnetically held to troffer 114. A programmable emergency power controller and an emergency power driver, or controllable DC power supply, may be held in casing 200, which may be housed in housing 103. Rechargeable battery, or other DC power supply, 102 may be housed in housing 103. Emergency power module 100 may comprise a programmable emergency power controller and an emergency power driver in casing 200 and rechargeable battery 102. Electrical lines 120 may be configured to provide electrical communication between emergency power module 100, luminaire 150, and an external electric power source. For example, electrical lines 120 may be placed in electrical communication with electrical lines 122.

Figure 5:
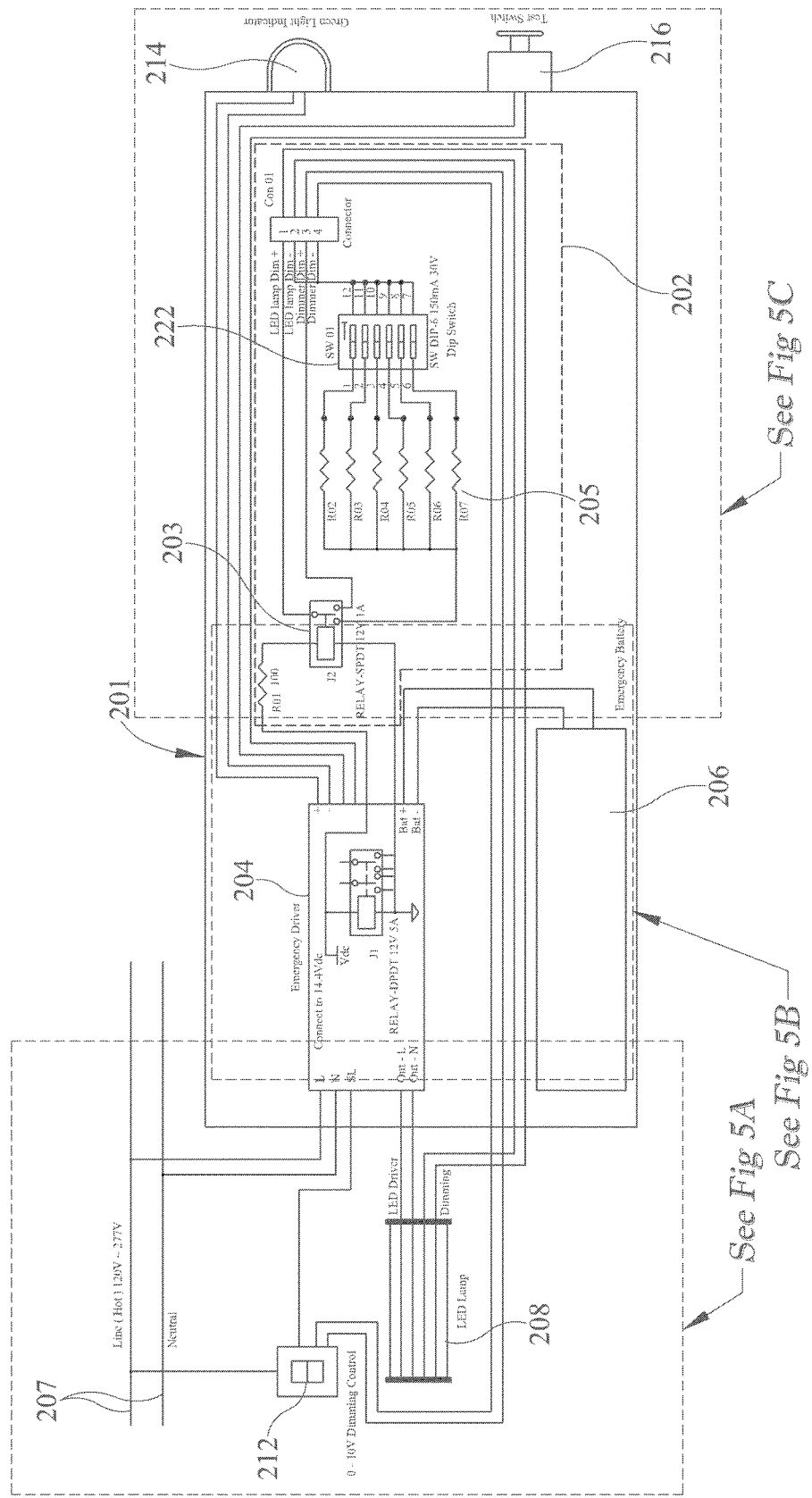
FIG. 5 is a schematic diagram of an emergency power module of the present disclosure.
Figure 5A:
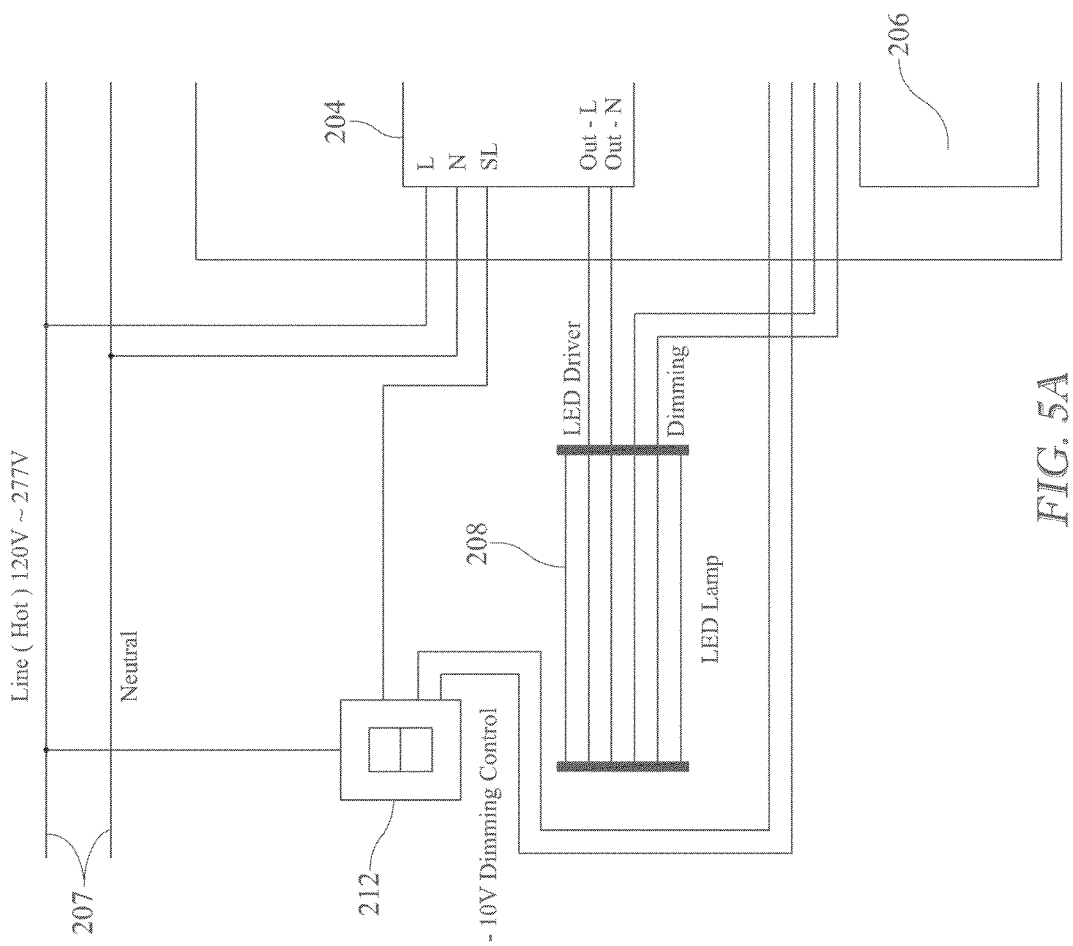
FIGS. 5a-5c show exploded portions of an emergency power module of the present disclosure.
Figure 5B:
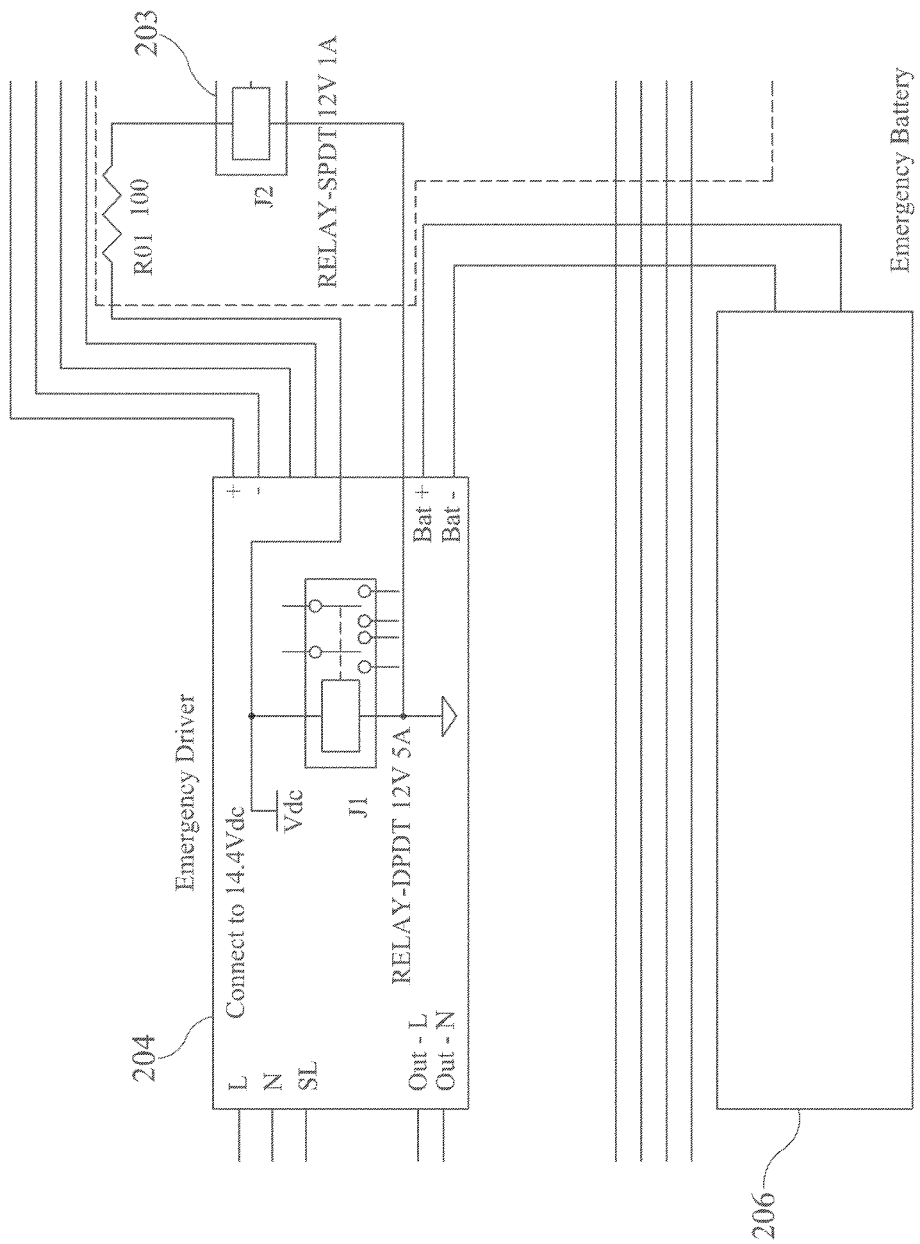
Figure 5C:
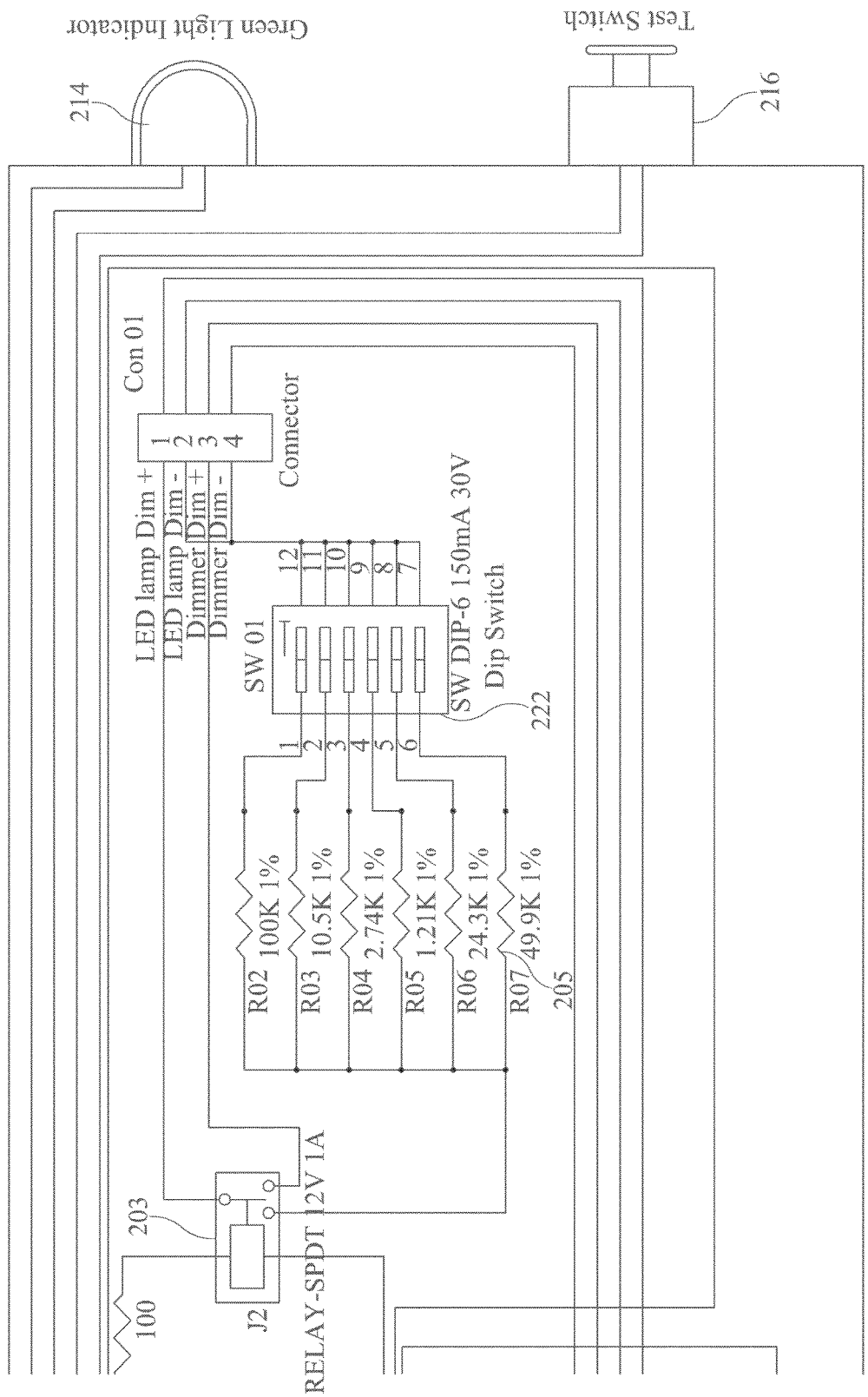

FIG. 5 shows a schematic diagram of an illustrative example of an emergency power module 201. Emergency power module 201 comprises an emergency power driver 204 in electrical communication with an external electrical power source, through electrical leads 207, and at least one electrical device, for example LED lamp(s) 208. Emergency power module 201 also has a rechargeable battery 206 in electrical communication with emergency power driver 204.

Emergency power driver 204 is configured to sense an interruption of power in the external electrical power source, through electrical leads 207, and direct power from rechargeable battery 206, through programmable emergency power controller 202, and to LED lamp(s) 208, upon the interruption of power in electrical leads 207.

Programmable emergency power controller 202 has at least one switch 222 configured and disposed to control the voltage of power flowing from rechargeable battery 206 to LED lamp(s) 208. Switches 222 may be manually controlled dip switches. A dimming controller 212, an indicator light 214, and/or a test switch 216 may be in electrical communication with emergency power module 201. For example, dimming controller 212 may be in communication with the external power source, the emergency power driver 204, and programmable emergency power controller 202. Programmable emergency power controller 202 may have a relay 203 configured and disposed to provide control of dimming controller 212 upon the emergency power driver sensing the interruption of power in the external electrical power source.

In an illustrative example, the programmable emergency power controller may be configured in a first state, by switching a switch 222 to an on position, configuring emergency power module 100 to deliver a selected amount of power to luminaire 150, having three LED lamps 116. In another illustrative example, the programmable emergency power controller may be configured in a second state, by switching another or different switch 222 to an on position, configuring emergency power module 100 to deliver the same selected amount of power to luminaire 150, having more or less than three LED lamps 116. These illustrative examples show that the same emergency power module 100 may be configured differently, by switching switches 222, to deliver the same desired power to electrical devices having different power demands. For example, emergency power module 100 may be configured to provide a desired emergency illumination for at least 90 minutes, whether one, two, or three lamps are in luminaire 150.

Emergency power module 201 may comprise emergency power driver 204, rechargeable battery 206, and programmable emergency power controller 202. Emergency power driver 204, rechargeable battery 206, and programmable emergency power controller 202 may be in electrical communication with each other, an external electrical power source, and LED lamp(s) 208. Emergency power driver 204 may be configured to sense an interruption of power in the external electrical power source and direct power from rechargeable battery 206, through programmable emergency power controller 202, and to LED lamp(s) 208, upon the interruption of power in the external electrical power source. Programmable emergency power controller 202 may be configurable to a first state and a second state.

In an illustrative example, power directed from rechargeable battery 206, through programmable emergency power controller 202 configured to the first state, to a sole LED lamp 208 may be substantially the same as the power directed from rechargeable battery 206, through programmable emergency power controller 202 configured to the second state, to a plurality of LED lamps 208, a power demand of the sole LED lamp 208 is different than a power demand of the plurality of LED lamps 208.

Figure 6:
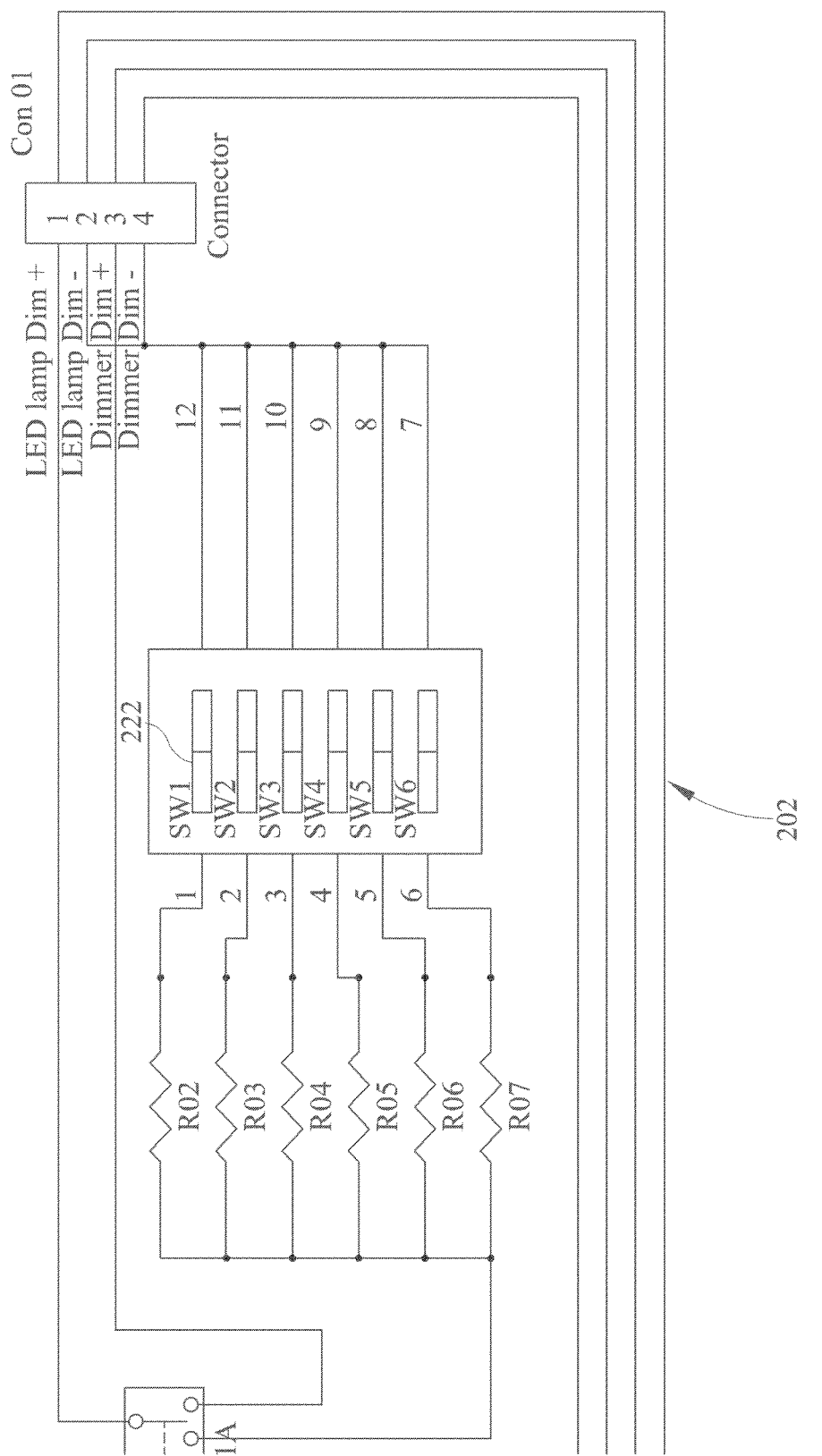
FIG. 6 is a schematic diagram of a portion of a programmable emergency power controller of the present disclosure.

FIG. 6 is a schematic diagram of programmable emergency power controller 202 of the present disclosure. Each switch 222 (SW1, SW2, SW3, SW4, SW5, and SW6) may have an on position and an off position and each switch 222 in the on position may configure programmable emergency power controller 202 to route power from rechargeable battery 206, through at least one resistor (R02, R03, R04, R05, R06, and/or R07), in a bank of resistors 205, and to LED lamp(s) 208. For example, emergency power module 202 may comprise a plurality or bank of switches 222 (SW1, SW2, SW3, SW4, SW5, and SW6) configured to control the voltage of power flowing from rechargeable battery 206 to LED lamp(s) 208, wherein each of the plurality of switches, SW1, SW2, SW3, SW4, SW5, and SW6, has an on position and an off position and is configured to control a desired voltage to LED lamp(s) 208.

Each of a plurality of switches 222, SW1, SW2, SW3, SW4, SW5, and SW6 may have a resistor, R02, R03, R04, R05, R06, R07, in electrical communication therewith and each switch may be configured to control a desired voltage to the at least one electrical device or at least one LED lamp 208, upon being switched to the on position. For example, programmable emergency power controller 202 may be configurable to a first state and a second state. The first state may, for example, have SW1 in an on position and SW2, SW3, SW4, SW5, and SW6 in an off position. The second state may, for example, may have SW2 in an on position and SW1, SW3, SW4, SW5, and SW6 in an off position. The power directed from rechargeable battery 206, through programmable emergency power controller 202 configured to the first state, to a single LED lamp 208, may be substantially the same as the power directed from rechargeable battery 206, through programmable emergency power controller 202 configured to the second state, to a two or more LED lamps 208, a power demand of the single LED lamp is different than a power demand of the two or more LED lamps.

Figure 7:
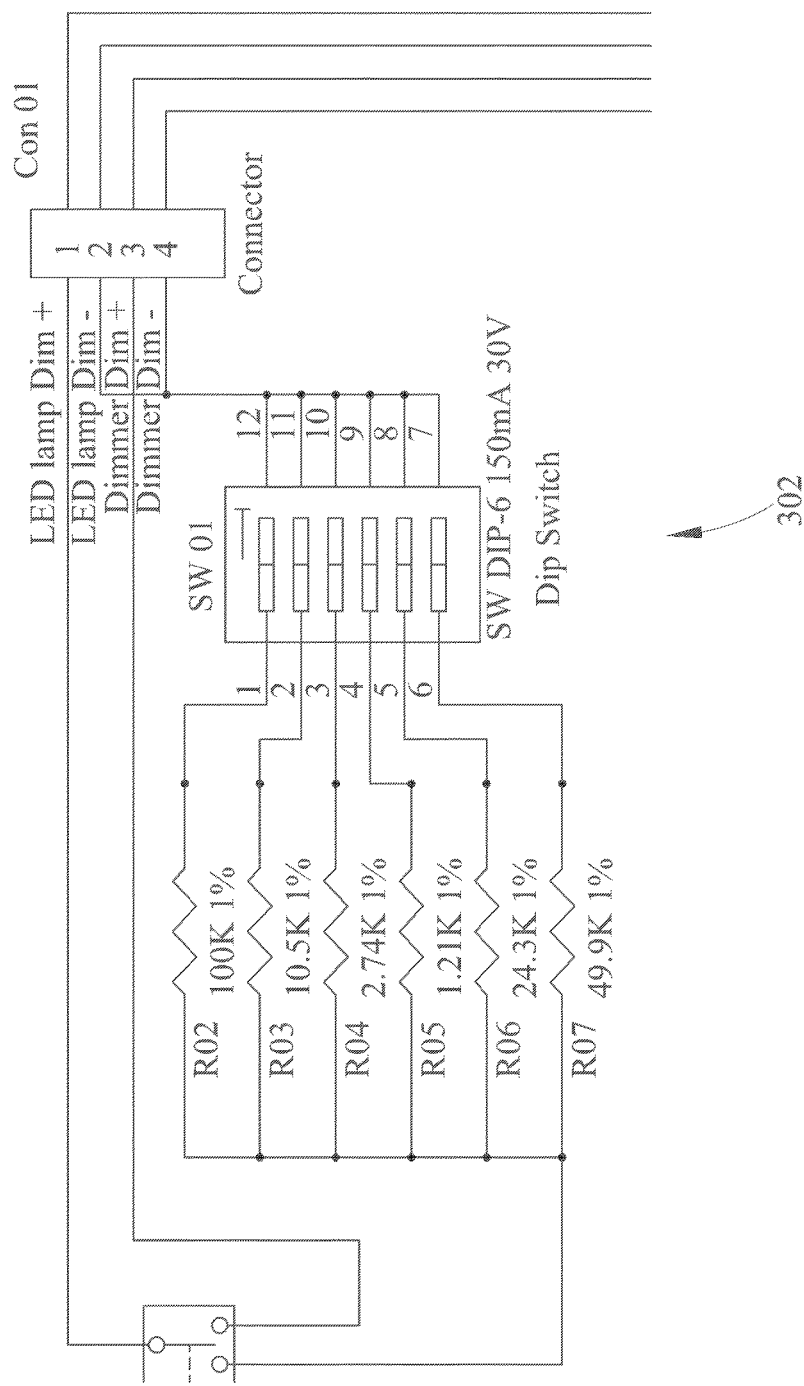
FIG. 7 shows a schematic diagram of an illustrative example of a portion of a programmable emergency power controller of the present disclosure.

FIG. 7 shows a schematic diagram of an illustrative example of a programmable emergency power controller 302. Programmable emergency power controller 302 has a switch SW1, SW2, SW3, SW4, SW5, and SW6 in electrical communication with a resistor R02, R03, R04, R05, R06, and R07, respectively. R02 may be 100 k Ohm, R03 may be 10.5 k Ohm, R04 may be 2.74 k Ohm, R05 may be 1.21 k Ohm, R06 may be 24.3 k Ohm, and R07 may be 49.9 k Ohm. Programmable emergency power controller 302 may be configured to control power from battery 206 to LED lamp(s) as shown in Table 1.

TABLE 1

| State | Switch Position | | | | | | Resistor | EM Output Watts | LED Lamp Power Demand Watts |
|---|---|---|---|---|---|---|---|---|---|
| | 1 | 2 | 3 | 4 | 5 | 6 | | | |
| 1 | | | | | | | 100K ohm | 16 W or 22 W | 1 × 4, 1 tube (16 W) or 2 × 2, 3 tube (22 W) |
| 2 | ON | | | | | | 10.5K ohm | 23 W | 1 × 4, 2 tube (32 W) |
| 3 | | ON | | | | | 2.74K ohm | 23 W | 1 × 4, 3 tube (50 W) |
| 4 | | | ON | | | | 1.21K ohm | 23 W | 1 × 4, 4 tube (64 W) |
| 5 | | | | ON | | | 24.3K ohm | 23 W | LITETRONICS MDL. RF32UQT240DL (32 W) |
| 6 | | | | | ON | | 49.9K ohm | 23 W | LITETRONICS MDL. RF50UQT440DL (50 W) |

Table 1 shows the versatility of the emergency power module of the present disclosure. The emergency power module may be configured to deliver a desired emergency power output to electrical devices having different power demands. For example, Table 1 shows programmable emergency power controller 302 may be configured in a plurality of states for operating different electrical devices having different power demands to deliver substantially the same emergency power to the electrical device. For example, a configuration of programmable emergency power controller 302 in state 2 is obtained by switching switch 2 to an on position. In state 2, programmable emergency power controller 302 is configured to control power from battery 206 to two 1×4 LED lamp tubes having a total power demand of 32 watts. The power is controlled to an emergency output of about 23 watts. In another example, a configuration of programmable emergency power controller 302 in state 3 is obtained by switching switch 3 to an on position. In state 3, programmable emergency power controller 302 is configured to control power from battery 206 to three 1×4 LED lamp tubes having a total power demand of 50 watts. The power is controlled to an emergency output of about 23 watts.

Programmable emergency power controller 302 may configure emergency lamp module 201 to provide a desired illumination level of the LED lamp(s) 208 for at least 90 minutes. At least one switch may be configured to control the voltage of power flowing from rechargeable battery 206 to the at least one electrical device between about 20 and 25 watts, or up to a maximum of about 23 watts, or between about 0 volts and about 10 volts.

Presently disclosed is a method for providing emergency power to at least one electrical device comprising: determining a power demand of the at least one electrical device; determining an amount of emergency power to supply to the at least one electrical device; configuring a controllable DC power supply to provide the determined amount of emergency power to supply to the at least one electrical device, wherein the configuring is based upon the determined power demand and the determined an amount of emergency power; sensing a disruption in a primary power supply to the at least one electrical device; and upon sensing the disruption in the primary power supply, providing the determined amount of emergency power to the at least one electrical device by controlling the supplied emergency power with the configured controllable DC power supply.

For example, with reference to Table 1, a power demand of 64 volts may be determined for an electronic device having 1×4, 4 tube (64 W). An amount of emergency power to supply to 1×4, 4 tubes (64 W) may be determined to be 23 watts. The controllable DC power supply may be configured with a programmable emergency power controller and setting to state 4, by switching switch 4 to the on position, to provide the determined amount of emergency power to supply to the at least one electrical device. As shown in Table 1, the configuring of the programmable emergency power controller is based upon the determined power demand and the determined an amount of emergency power.

There is thus provided an emergency power module and a method for providing emergency power to at least one electrical device. One feature or aspect of an illustrative example is believed at the time of the filing of this patent application to possibly reside broadly in an emergency power module comprising: an emergency power driver in electrical communication with an external electrical power source and at least one electrical device; a rechargeable battery in electrical communication with the emergency power driver; the emergency power driver being configured to sense an interruption of power in the external electrical power source and direct power from the rechargeable battery through an programmable emergency power controller and to the at least one electrical device, upon the interruption of power in the external electrical power source; the programmable emergency power controller having at least one switch configured and disposed to control the voltage of power flowing from the rechargeable battery to the at least one electrical device.

Another feature or aspect of an illustrative example is believed at the time of the filing of this patent application to possibly reside broadly in an emergency power module wherein the at least one switch is a manually controlled dip switch.

Yet another feature or aspect of an illustrative example is believed at the time of the filing of this patent application to possibly reside broadly in an emergency power module, wherein each of the at least one switch has an on position and an off position and each switch in the on position configures the programmable emergency power controller to route power from the rechargeable battery, through at least one resistor, and to the at least one electrical device.

Still another feature or aspect of an illustrative example is believed at the time of the filing of this patent application to possibly reside broadly in an emergency power module, wherein the at least one electrical device comprises at least one LED lamp.

A further feature or aspect of an illustrative example is believed at the time of the filing of this patent application to possibly reside broadly in an emergency power module, wherein the at least one switch is configured to control the voltage of power flowing from the rechargeable battery to the at least one electrical device between about 20 and 25 watts.

Another feature or aspect of an illustrative example is believed at the time of the filing of this patent application to possibly reside broadly in an emergency power module, wherein the at least one switch is configured to control the voltage of power flowing from the rechargeable battery to the at least one electrical device up to a maximum of about 23 watts.

Yet another feature or aspect of an illustrative example is believed at the time of the filing of this patent application to possibly reside broadly in an emergency power module comprising a plurality of switches configured to control the voltage of power flowing from the rechargeable battery to the at least one electrical device, wherein each of the plurality of switches has an on position and an off position and is configured to control a desired voltage to the at least one electrical device.

Still another feature or aspect of an illustrative example is believed at the time of the filing of this patent application to possibly reside broadly in an emergency power module, wherein each of the plurality of switches has at least one resistor in electrical communication therewith and is configured to control a desired voltage to the at least one electrical device upon being switched to the on position.

A further feature or aspect of an illustrative example is believed at the time of the filing of this patent application to possibly reside broadly in an emergency power module comprising a housing configured to hold the emergency module to the at least one electrical device or a portion of a structure.

Another feature or aspect of an illustrative example is believed at the time of the filing of this patent application to possibly reside broadly in an emergency power module, wherein the housing is configured to mechanically or magnetically hold the emergency module to the at least one electrical device or the portion of the structure.

Yet another feature or aspect of an illustrative example is believed at the time of the filing of this patent application to possibly reside broadly in an emergency power module comprising: an emergency power driver in electrical communication with an external electrical power source and at least one electrical device; a rechargeable battery in electrical communication with the emergency power driver; the emergency power driver being configured to sense an interruption of power in the external electrical power source and direct power from the rechargeable battery through an programmable emergency power controller and to the at least one electrical device, upon the interruption of power in the external electrical power source; the programmable emergency power controller being configurable to a first state and a second state; and wherein the power directed from the rechargeable battery, through the programmable emergency power controller configured to the first state, to a first electrical device is substantially the same as the power directed from the rechargeable battery, through the programmable emergency power controller configured to the second state, to a second electrical device, a power demand of the first electrical device being different than a power demand of the second electrical device.

One feature or aspect of an illustrative example is believed at the time of the filing of this patent application to possibly reside broadly in an emergency power module comprising a first switch for configuring the programmable emergency power controller to the first state and a second switch for configuring the programmable emergency power controller to the second state.

Another feature or aspect of an illustrative example is believed at the time of the filing of this patent application to possibly reside broadly in an emergency power module, wherein the programmable emergency power controller is configurable to a third state, wherein the power directed from the rechargeable battery, through the programmable emergency power controller configured to the third state, to the third electrical device, is substantially the same as the power directed from the rechargeable battery, through the programmable emergency power controller configured to the first state, to the first electrical device, a power demand of the third electrical device being different than the power demand of the first and second electrical devices.

Yet another feature or aspect of an illustrative example is believed at the time of the filing of this patent application to possibly reside broadly in an emergency power module, wherein the first switch has a first resistor in electrical communication therewith and the second switch has a second resistor in electrical communication therewith.

Still another feature or aspect of an illustrative example is believed at the time of the filing of this patent application to possibly reside broadly in an emergency power module, wherein the first resistor has a different resistance than the second resistor.

A further feature or aspect of an illustrative example is believed at the time of the filing of this patent application to possibly reside broadly in an emergency power module comprising a housing configured to mechanically or magnetically hold the emergency module.

Another feature or aspect of an illustrative example is believed at the time of the filing of this patent application to possibly reside broadly in an emergency power module, wherein the at least one electrical device comprises an LED lamp and the configuration of the programmable emergency power controller in the first state or the second state enables a desired illumination level of the LED lamp for at least 90 minutes.

Yet another feature or aspect of an illustrative example is believed at the time of the filing of this patent application to possibly reside broadly in a method for providing emergency power to at least one electrical device comprising the steps of: determining a power demand of the at least one electrical device; determining an amount of emergency power to supply to the at least one electrical device; configuring a programmable emergency power controller to provide the determined amount of emergency power to supply to the at least one electrical device, wherein the configuring is based upon the determined power demand and the determined an amount of emergency power; sensing a disruption in a primary power supply to the at least one electrical device; and upon sensing the disruption in the primary power supply, providing the determined amount of emergency power to the at least one electrical device by controlling the emergency power, supplied by a battery, with the configured regulator.

Still another feature or aspect of an illustrative example is believed at the time of the filing of this patent application to possibly reside broadly in a method for providing emergency power to at least one electrical device, wherein the step of configuring a programmable emergency power controller to provide the determined amount of emergency power to supply to the at least one electrical device comprises moving at least one switch into an on position from an off position.

A further feature or aspect of an illustrative example is believed at the time of the filing of this patent application to possibly reside broadly in a method for providing emergency power to at least one electrical device, wherein the moving of at least one switch into an on position from an off position directs the flow of power from the battery through at least one resistor.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An emergency power module comprising:
   an emergency power driver in electrical communication with an external electrical power source and at least one electrical device; and
   a DC power supply;
   the emergency power driver being configured to sense an interruption of power in the external electrical power source and direct power from the DC power supply through a programmable emergency power controller and to the at least one electrical device, upon the interruption of power in the external electrical power source; and the programmable emergency power controller is programmable through a program interface and configured and disposed to control a programmed voltage of power to flow from the DC power supply to the at least one electrical device.

2. The emergency power module of claim 1, wherein the programmable emergency power controller is electronically programmable.

3. The emergency power module of claim 1, wherein the programmable emergency power controller is manually programmable and the program interface has at least one dip switch.

4. The emergency power module of claim 3 wherein the program interface has a plurality of the dip switches configured to control the voltage of power flowing from the DC power supply to the at least one electrical device, wherein each of the plurality of dip switches has an on position and an off position and is configured to control the programmed voltage to the at least one electrical device.

5. The emergency power module of claim 4, wherein each of the plurality of dip switches has at least one resistor in electrical communication therewith and is configured to program the programmable emergency power controller to control a desired voltage to the at least one electrical device upon being switched to the on position.

6. The emergency power module of claim 1, wherein the programmable emergency power controller is configured to route power from the DC power supply and through at least one resistor, or from a controllable DC power supply, and to the at least one electrical device, upon the sensed interruption of power in the external electrical power source.

7. The emergency power module of claim 1, wherein the programmable emergency power controller comprises a relay configured and disposed to control voltage from a dimmer, upon the emergency power driver sensing the interruption of power in the external electrical power source, the dimmer being in communication with the external power source, the emergency power driver, and the programmable emergency power controller.

8. The emergency power module of claim 1, wherein the programmable emergency power controller is programmable to control the power flowing to the at least one electrical device, upon the sensed interruption of power in the external electrical power source, between about 0 to about 10 volts.

9. The emergency power module of claim 1 further comprising a housing configured to hold the emergency module to the at least one electrical device or a portion of a structure.

10. The emergency power module of claim 9, wherein the housing is configured to mechanically or magnetically hold the emergency module to the at least one electrical device or the portion of the structure.

11. An emergency power module comprising:

an emergency power driver in electrical communication with an external electrical power source and at least one electrical device; and a rechargeable battery in electrical communication with the emergency power driver or the external electrical power source;

the emergency power driver being configured to sense an interruption of power in the external electrical power source and direct power from the rechargeable battery through a programmable emergency power controller and to the at least one electrical device, upon the interruption of power in the external electrical power source;

the programmable emergency power controller being configurable to a first state and a second state; and wherein the power directed from the rechargeable battery, through the programmable emergency power controller configured to the first state, to a first electrical device is substantially the same as the power directed from the rechargeable battery, through the programmable emergency power controller configured to the second state, to a second electrical device, a power demand of the first electrical device being different than a power demand of the second electrical device.

12. The emergency power module of claim 11 comprising a first switch for configuring the programmable emergency power controller to the first state and a second switch for configuring the programmable emergency power controller to the second state.

13. The emergency power module of claim 12, wherein the first switch has a first resistor in electrical communication therewith and the second switch has a second resistor in electrical communication therewith.

14. The emergency power module of claim 13, wherein the first resistor has a different resistance than the second resistor.

15. The emergency power module of claim 11, wherein the programmable emergency power controller is configurable to a third state, wherein the power directed from the rechargeable battery, through the programmable emergency power controller configured to the third state, to a third electrical device, is substantially the same as the power directed from the rechargeable battery, through the programmable emergency power controller configured to the first state, to the first electrical device, a power demand of the third electrical device being different than the power demand of the first and second electrical devices.

16. The emergency power module of claim 11 further comprising a housing configured to mechanically or magnetically hold the emergency module.

17. The emergency power module of claim 11, wherein the first electrical device comprises at least one LED lamp and the configuration of the programmable emergency power controller in the first state enables a desired illumination level of the at least one LED lamp for at least 90 minutes.

18. A method for providing emergency power to at least one electrical device comprising the steps of:

determining a power demand of the at least one electrical device;

determining an amount of emergency power to supply to the at least one electrical device;

configuring a controllable DC power supply to provide the determined amount of emergency power to supply to the at least one electrical device, wherein the configuring is based upon the determined power demand and the determined amount of emergency power;

sensing a disruption in a primary power supply to the at least one electrical device; and upon sensing the disruption in the primary power supply, providing the determined amount of emergency power to the at least one electrical device by controlling the supplied emergency power with the configured controllable DC power supply.

19. The method of claim 18, wherein the step of configuring the controllable DC power supply to provide the determined amount of emergency power to supply to the at least one electrical device comprises moving at least one switch into an on position from an off position.

20. The method of claim 19, wherein the moving of at least one switch into an on position from an off position directs the flow of power from a battery, through at least one resistor and to the at least one electrical device.

\* \* \* \* \*